(12) United States Patent  (10) Patent No.: US 7,972,011 B2
Kurozuka et al.  (45) Date of Patent: Jul. 5, 2011

(54) IMAGE PROJECTION APPARATUS AND IMAGE PROJECTION SYSTEM HAVING BEAM DEFLECTION SECTION

(75) Inventors: Akira Kurozuka, Osaka (JP); Hironori Tomita, Nara (JP)

(73) Assignee: Panasonic Corporation, Osaka (JP)

( * ) Notice: Subject to any disclaimer, the term of this patent is extended or adjusted under 35 U.S.C. 154(b) by 398 days.

(21) Appl. No.: 12/282,672

(22) PCT Filed: Mar. 12, 2007

(86) PCT No.: PCT/JP2007/054804
§ 371 (c)(1),
(2), (4) Date: Sep. 12, 2008

(87) PCT Pub. No.: WO2007/105678
PCT Pub. Date: Sep. 20, 2007

(65) Prior Publication Data
US 2009/0091666 A1 Apr. 9, 2009

(30) Foreign Application Priority Data
Mar. 14, 2006 (JP) .................. 2006-068775

(51) Int. Cl.
*G03B 21/28* (2006.01)
(52) U.S. Cl. .......................... 353/50; 353/77
(58) Field of Classification Search .............. 353/50, 353/77; 359/197.1, 201.2, 212.1
See application file for complete search history.

(56) References Cited

U.S. PATENT DOCUMENTS

| 6,843,568 | B2 * | 1/2005 | Schenk et al. | 353/46 |
| 6,947,189 | B2 * | 9/2005 | Hagelin et al. | 359/201.1 |
| 2002/0024708 | A1 | 2/2002 | Lewis et al. | |
| 2002/0149512 | A1 | 10/2002 | Oki | |
| 2007/0035826 | A1 | 2/2007 | Yokoyama et al. | |

FOREIGN PATENT DOCUMENTS

| JP | 2724016 | 10/1991 |
| JP | 2001-100316 | 4/2001 |
| JP | 2001-100317 | 4/2001 |
| JP | 2003-004851 | 1/2003 |
| JP | 2003-255252 | 9/2003 |
| JP | 2004-527793 | 9/2004 |
| JP | 2005-107150 | 4/2005 |

OTHER PUBLICATIONS

International Search Report for corresponding Application No. PCT/JP2007/054804 dated Apr. 10, 2007.

* cited by examiner

*Primary Examiner* — Thanh X Luu
(74) *Attorney, Agent, or Firm* — Renner, Otto, Boisselle & Sklar, LLP

(57) ABSTRACT

An image projector according to the present invention includes a light source for emitting a laser beam, of which the intensity has been modulated in accordance with a modulation signal representing an image to be projected, and a beam deflection section for deflecting the laser beam two-dimensionally such that the image is produced by repeatedly scanning a screen with the laser beam in a predetermined pattern. The predetermined pattern has a repetitive frequency that is lower than a frame rate of the image.

13 Claims, 3 Drawing Sheets

IMAGE PROJECTION APPARATUS AND IMAGE PROJECTION SYSTEM HAVING BEAM DEFLECTION SECTION

TECHNICAL FIELD

The present invention relates to a projection image projector for presenting image information on a screen by projecting coherent light such as a laser beam thereto.

BACKGROUND ART

Some people proposed that a laser diode be used as a light source for an image projector (which is often simply called a "projector") that is designed to project an image onto a screen. A laser diode can emit light with higher color purity than an incandescent lamp for use in a conventional image projector. That is why it is expected that the image projected would have increased color reproducibility with the use of a laser diode.

Also, if a semiconductor laser diode is used, then a dichroic mirror, which is needed as a spectral element for a conventional incandescent lamp, and other optical elements can be omitted, thus simplifying and downsizing the structure of the optical system and increasing the optical efficiency. For that reason, it is expected that a smaller power-saving image projector would be realized with a semiconductor laser diode.

On top of that, if a laser diode is used as a light source, a sharply focused laser beam may be used as a scanning beam. That is why by using a laser diode as a light source for an image projector, a scanning image projector for producing an image by making a two-dimensional scan with a laser beam by way of a scanning means such as a mirror would also be realized.

The scanning image projector produces an image by changing the intensities of a laser beam. For that reason, the scanning image projector that uses a laser light source can save even more power than a normal image projector that uses a two-dimensional image display device such as an LCD panel or a DMD (digital mirror device). What is more, the scanning image projector needs no illumination optical system to illuminate a two-dimensional image device uniformly, and is expected to have an even smaller size.

By taking advantage of these beneficial features, the scanning laser image projector could also be built in a small mobile electronic unit. For example, even with a small mobile electronic unit such as a cellphone, which is usually hard to be equipped with a big monitor, the user can also enjoy a big screen display.

For example, Patent Document No. 1 discloses a laser scanning image projector for making a raster scan with a laser beam. Specifically, the image projector makes a horizontal scan back and forth and a vertical scan using a stepwise drive signal, and stops the vertical scan while making the horizontal scan.

On the other hand, Patent Document No. 2 discloses a laser scanning image projector that draws a Lissajous pattern with deflection frequencies f1 and f2 that satisfy f1:f2=n:m and that presents an image at a frequency fr (=f1/n=f2/m) at which the Lissajous pattern makes one round.

It is known that in presenting an image by projecting coherent light such as a laser beam onto a screen, the laser beams reflected from the projection plane would interfere with each other, thus producing speckle noise that would make the projected image look glaring or too dark or too bright locally.

As shown in FIG. 4, a projection plane 301 such as a screen is normally not completely flat but has some unevenness. If laser beams 302 and 303 are projected from a laser light source 304 onto such a projection plane 301, the reflected beams will intersect with each other at a point A because the projection plane 301 has unevenness. In this case, if the difference between the optical path lengths of the laser beams 302 and 303 as measured from the laser light source 304 to the point A is an integral multiple of the wavelength of the laser beam, then the laser beams 302 and 303 will enhance each other due to interference. On the other hand, if the difference between the optical path lengths of the laser beams 302 and 303 to the point A is an integral multiple of a half wavelength, then the laser beams 2 and 3 will weaken each other due to interference.

In this manner, the image comes to have some portions with excessively high luminances and some portions with excessively low luminances, thus producing speckle noise and debasing the quality of the image projected.

To reduce such speckle noise, Patent Document No. 3 proposes vibrating the screen with a gas flow and moving the unevenness at the surface of the screen.

Patent Document No. 1: Japanese Patent No. 2724016
Patent Document No. 2: U.S. Pat. No. 6,843,568
Patent Document No. 3: Japanese Patent Application Laid-Open Publication No. 2005-107150

DISCLOSURE OF INVENTION

Problems To Be Solved By the Invention

The method disclosed in Patent Document No. 3, however, requires a dedicated screen. That is why the image projector and the screen should be carried together. That is to say, even when the image projector has a size that is small enough to build it in a cellphone, that special type of screen, which is much bigger than the cellphone itself, should still be carried around.

In order to overcome the problems described above, the present invention has an object of providing an image projector that can reduce the speckle noise of an image projected.

Means For Solving the Problems

An image projector according to the present invention includes a light source for emitting a laser beam, of which the intensity has been modulated in accordance with a modulation signal representing an image to be projected, and a beam deflection section for deflecting the laser beam two-dimensionally such that the image is produced by repeatedly scanning a screen with the laser beam in a predetermined pattern. The predetermined pattern has a repetitive frequency that is lower than a frame rate of the image.

In one preferred embodiment, the predetermined pattern is a Lissajous pattern.

In this particular preferred embodiment, the beam deflection section makes the deflection at first and second deflection frequencies f1 and f2 around first and second axes of deflection, respectively. f1:f2=n:m (where m and n are relatively prime integers) is satisfied such that the deflected beam draws the Lissajous pattern, and the repetitive frequency fr of the pattern satisfies fr=f1/n=f2/m.

In a specific preferred embodiment, the beam deflection section includes a mirror portion that is resonantly driven about two axes and that reflects the laser beam.

In another preferred embodiment, the predetermined pattern is a raster scan pattern.

In a specific preferred embodiment, the beam deflection section is an MEMS mirror device that has been fabricated on a silicon wafer by a micromachining technology.

An image projection system according to the present invention includes an image projector according to any of the preferred embodiments of the present invention described above and a screen that either reflects or transmits the beam projected there.

Effects of the Invention

According to the present invention, laser beam scanning traces are different between at least two continuous image frames, and therefore, the speckle noise components of mutually different patterns are superposed one upon the other and averaged, thus making the noise much less noticeable. As a result, the quality of the image projected can be improved.

Figure 1:
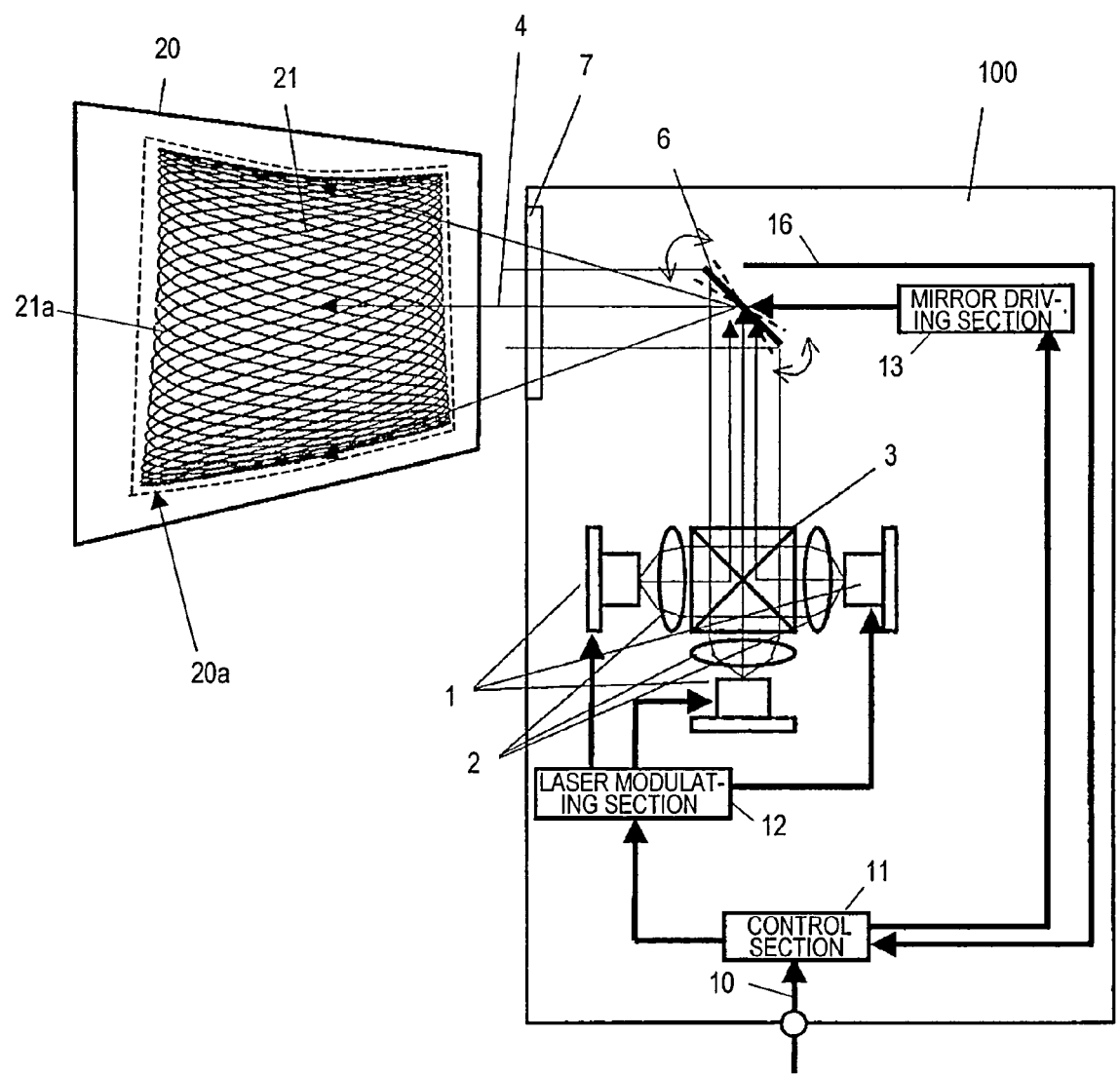
FIG. 1 illustrates an arrangement for an image projector as a preferred embodiment of the present invention.

DESCRIPTION OF REFERENCE NUMERALS 1 light source
2 collimator lens
3 dichroic prism
4 projected beam
6 beam deflection section
7 aperture
10 image signal
11 control section
12 laser modulating section
13 mirror driving section
16 angular displacement signal
20 screen
21 beam spot trace
62 insulating layer
63 device layer
64 handling layer
65 mirror portion
66 intermediate frame
67 X hinge
68 Y hinge
69a, 69b X comb electrode
71a, 71b Y comb electrode
73 outer frame portion
74 isolating groove
80 X pad
81 Y pad
82 ground pad

BEST MODE FOR CARRYING OUT THE INVENTION

Hereinafter, a preferred embodiment of an image projector according to the present invention will be described with reference to the accompanying drawings.

FIG. 1 is a block diagram showing an arrangement for an image projector 100, which includes a light source 1 and a beam deflection section 6.

If the image projector 100 is designed to project a color image, the light source 1 preferably includes three light source units that radiate laser beams in the three primary colors of R, G and B, respectively. The laser beams that have been emitted from those three light source units of the light source 1 are converged by their associated collimator lenses 2 and then combined together by the dichroic prism 3, thereby forming a single laser beam 4. The laser beam 4 is deflected two-dimensionally by the beam deflection section 6 and then projected onto a screen 20 through an aperture 7.

To present an image on the screen 20 by projecting the laser beam 4 onto the screen 20, the laser beam 4 has its intensity modulated in accordance with a modulation signal representing the image to be projected. Also, the beam deflection section 6 deflects the laser beam 4 two-dimensionally such that the image is produced by repeatedly scanning the screen with the laser beam 4 in a predetermined pattern. For that purpose, the image projector 100 includes a control section 11, a laser modulating section 12 and a mirror driving section 13.

The control section 11 receives an image signal 10 representing the image to be presented and outputs a control signal to the laser modulating section 12 and to the mirror driving section 13. In response to the control signal supplied from the control section 11, the mirror driving section 13 drives the beam deflection section 6. As will be described in detail later, the beam deflection section 6 includes a mirror portion, which is driven by the mirror driving section 13 so as to deflect the laser beam 4 two-dimensionally.

The beam deflection section 6 generates an angular displacement signal 16 representing the angle of displacement of a scan mirror and outputs it to the control section 11. In accordance with this signal, the control section 11 performs a feedback control on the beam deflection section 6.

Specifically, the control section 11 figures out the beam spot location of the light beam that has been projected onto the screen 20 based on the angular displacement signal 16, calculates an intensity modulating signal for the light source based on the beam spot location thus obtained and the data included in the image signal 10 and then outputs it to the laser modulating section 12. In accordance with the intensity modulating signal, the laser modulating section 12 modulates the intensity of the light emitted from the light source 1.

Figure 2:
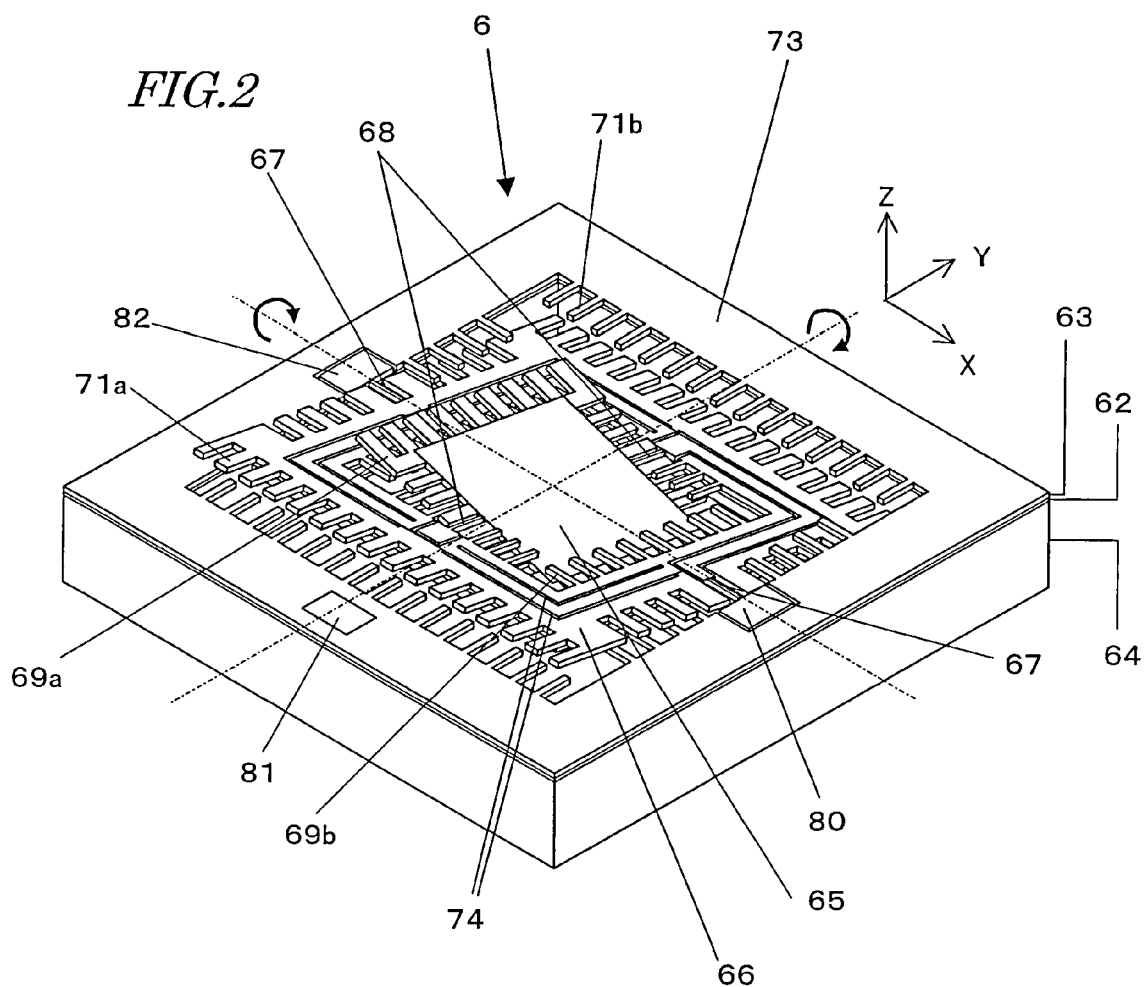
FIG. 2 is a perspective view illustrating the structure of the beam deflection section of the image projector shown in FIG. 1.

FIG. 2 is a perspective view illustrating an example of the beam deflection section 6, which is preferably an MEMS mirror device that has been fabricated on a silicon wafer by a micromachining technology.

Specifically, the beam deflection section 6 is formed by processing an SOI wafer, which may be a stack of a device layer 63 with a thickness of 100 μm, an insulating layer 62 with a thickness of several μm and a handling layer 64 with a thickness of 500 μm, for example, by the micromachining technology.

The beam deflection section 6 includes a mirror portion 65 that is arranged at the center, an intermediate frame 66 that is arranged to surround the mirror portion 65, and an outer frame portion 73 that is arranged as an outermost portion so as to surround the intermediate frame 66. All of these elements have been formed by etching the device layer 63. The handling layer 64 has been etched away from the back surface of all elements but the outer frame portion 73.

The intermediate frame 66 is supported by the outer frame 73 so as to turn on X hinges 67 around an X-axis. On the other hand, the mirror portion 65 is supported by the intermediate frame 66 so as to turn on Y hinges 68 around a Y-axis. Furthermore, the mirror portion 65 and the intermediate frame 66 respectively include X comb electrodes 69a and 69b that engage with each other, while the intermediate frame 66 and the outer frame portion 73 respectively include Y comb electrodes 71a and 71b that engage with each other. It should be noted that the respective comb teeth of the X and Y comb electrodes 69a, 69b, 71a and 71b are illustrated on a larger scale to make their shapes easily recognizable and are not accurately illustrated in their actual shapes.

The intermediate frame 66 has isolating grooves 74 that form band electrodes to electrically connect the mirror portion 65 to an X pad 80, the intermediate frame 66 to a ground pad 82 and the outer frame portion 73 to a Y pad 81, respectively. To prevent the intermediate frame 65 from being separated by the isolating grooves 74, a portion of the handling layer 64 is left thinly on the back surface of the intermediate frame 66 so as to function as a backing layer.

In such an arrangement, if a voltage is applied to the X pad 80 with the ground pad 82 grounded, a drive voltage is applied to the X comb electrodes 69a. On the other hand, if a voltage is applied to the Y pad 81, a drive voltage is applied to the Y comb electrodes 71b. And if voltages are applied to both the X and Y comb electrodes 69a and 71b, then electrostatic force is produced to drive the tilted mirror portion 65 and intermediate frame 66 back to their neutral positions.

If a pulse voltage, of which the frequency is twice as high as the resonant frequency to be determined by the moments of inertia of the mirror portion 65 and the intermediate frame 66 and the spring constant of the hinges, is applied, then the mirror portion 65 produces resonances around the Y axis and the intermediate frame 66 produces resonances around the X axis, thus producing rotations and vibrations. As a result, the laser beam that has been incident on the mirror portion 65 is deflected two-dimensionally. The moments of inertia and the spring constant of the hinges that determine the resonant frequencies of the mirror portion 65 and the intermediate frame 66 are defined by spring constants that are based on the shapes and masses of the mirror portion 65 and the intermediate frame 66 and the shapes and materials of the X and Y hinges 67 and 68. That is why by adjusting these constants, the mirror portion 65 and the intermediate frame 66 can be turned and vibrated at desired resonant frequencies. That is to say, the mirror portion 65 can be rotated and vibrated around the X and Y axes at desired resonant frequencies.

In this preferred embodiment, the mirror portion 65 of the beam deflection section 6 can turn and vibrate around the two axes. However, the same function can also be achieved even by providing two beam deflection sections, each of which includes a mirror portion that can turn and vibrate around only one axis.

Hereinafter, an image presentation method according to this preferred embodiment will be described.

As shown in FIG. 1, the laser beam 4 that is being deflected two-dimensionally by the beam deflection section 6 draws a beam spot trace 21 on the screen 20. As described above, the mirror portion 65 of the beam deflection section 6 is resonantly driven around the two axes. Thus, the scanning laser beam 4 draws a pattern consisting of Lissajous curves.

A Lissajous curve is a plane figure drawn by a trace that is obtained by combining two harmonic oscillations that are orthogonal to each other. Generally speaking, the greater the frequency ratio of two harmonic oscillations, the more densely the Lissajous curves scan a parallelogram area while slightly shifting from each other. For example, a laser beam that has drawn a point 21a at a certain point in time will draw Lissajous curves while slightly shifting its scan positions and then return to the point 21a again in a predetermined period. Those curves to be drawn while the drawing makes one round will be referred to herein as a "Lissajous pattern".

Suppose the frequencies of horizontal and vertical deflections produced by the resonant drives around the Y and X axes are identified by f1 and f2, respectively. If the ratio of f1 to f2 is a ratio of two relatively prime integers (i.e., if f1:f2=m:n, where m and n are relatively prime integers), then the laser beam 4 draws the same Lissajous pattern a number of times in a predetermined period fr. This predetermined period fr is given by the following Equation (1):

$$fr = f1/n = f2/m \tag{1}$$

In a Lissajous pattern, the line pitch changes from one location to another. The maximum line pitch is represented by the following Equation (2):

$$\Delta = \pi \cdot pv \cdot fr/2fh \tag{2}$$

In Equation (2), pv denotes the number of vertical pixels and fh denotes the horizontal deflection frequency. If this maximum line pitch is at most equal to one pixel, the image can be presented with a desired resolution. That is to say, the maximum line pitch Δ may be equal to or smaller than one. In that case, the following Inequality (3) should be satisfied:

$$\pi \cdot pv \cdot fr/2fh < 1 \tag{3}$$

By solving this Inequality (3) with respect to fh, the following Inequality (4) can be obtained:

$$fh > \pi \cdot pv \cdot fr/2 \tag{4}$$

For example, if the resolution of the image projected is a VGA grade (i.e., 640×480 pixels) and if the frame rate is 30 Hz, then the horizontal deflection frequency fh may be equal to or higher than 22,619 Hz as represented by the following Equation (5):

$$fh > \pi \times 480 \times 30/2 = 22{,}619 \text{ Hz} \tag{5}$$

For instance, fh=fr×n=30×756=22,680 Hz may be met, m that is relatively prime with respect to n may be 61, and the vertical deflection frequency fv may be 1,830 Hz, which is calculated by the following Equation (6):

$$fv = 30 \times 61 = 1830 \text{ Hz} \tag{6}$$

By setting the horizontal and vertical deflection frequencies fh and fv to be 22,680 Hz and 1,830 Hz, respectively, in this manner, the mirror portion 65 of the beam deflection section 6 draws the Lissajous pattern repeatedly at a frequency of 30 Hz, thereby presenting the image. That is to say, the beam spot trace 21 on the screen 20 is presented repeatedly at 30 Hz.

According to Patent Document No. 2, the frame rate of the image agrees with the repetitive frequency of the Lissajous pattern as described above. That is why in presenting respective frames, the laser beam will follow the same trace over and over again. Since speckle noise depends on the trace of the laser beam, the same speckle noise pattern will be repeatedly presented one frame after another.

To overcome such a problem, the image projector of this preferred embodiment defines the repetitive frequency of the Lissajous pattern (i.e., the frequency at which the Lissajous pattern completes one cycle) to be lower than the frame rate of the image. More specifically, the repetitive frequency of the Lissajous pattern is set to be 15 Hz, for example. In that case, the horizontal and vertical deflection frequencies fh and fv are set to be 22,680 Hz and 915 Hz, respectively, as in the following Equations (7) and (8):

$$fh = 15 \times 1{,}512 = 22{,}680 \text{ Hz} \tag{7}$$

$$fv = 15 \times 61 = 915 \text{ Hz} \tag{8}$$

Then, the number of vertical pixels Pv will be calculated 962.6 by the following Equation (9):

$$pv = 2fh/\pi \cdot fr = 962.6 \qquad (9)$$

That is to say, the Lissajous pattern comes to have a repetitive frequency of 15 Hz and the image is presented with the number of vertical pixels doubled.

Consequently, if the laser modulating section 12 modulates the intensity of the laser beam emitted from the light source such that the Lissajous pattern, which is the unit of repetition, presents two frames of the image, then the image can be presented substantially at a frame rate of 30 Hz. In that case, those two continuous frames of the image will be presented by Lissajous patterns that will have followed two different traces.

If the repetitive frequency of a Lissajous pattern is defined to be A times as low as the frame rate of an image to display, then A frames that will be presented on mutually different traces will be superposed one upon the other. That is why the speckle patterns to be produced on the image will be averaged and become much less noticeable, which is very much beneficial. It is generally known that if a number A of mutually independent speckle patterns are superposed one upon the other, the contrast of the speckle noise can be reduced to $1/\sqrt{A}$. Thus, according to this preferred embodiment, an image can be presented with the speckle noise reduced to $1/\sqrt{2}$ compared to a conventional one.

As described above, according to this preferred embodiment, the laser beam scans on a different trace every frame of the image to display, and therefore, the speckle patterns produced on the respective frames can be different from each other. As a result, the uneven luminance patterns that have been formed on the viewer's retinas will be superposed one upon the other and averaged, thus making the noise much less noticeable and eventually improving the quality of the image projected. If the display rate is defined to be at least twice as high as the actual video frame rate and if the cyclic scanning frequency is defined as described above with respect to that display rate, the flicker can be further reduced, too.

As can be seen easily from Inequalities (4) and (5), the horizontal deflection frequency fh depends on the resolution of the image to project and the repetitive frequency of a Lissajous pattern can be adjusted by changing the ratios of the horizontal and vertical deflection frequencies fh and fv. Consequently, the repetitive frequency of the Lissajous pattern can be adjusted without significantly changing the resonant frequencies of the mirror portion 65 of the beam deflection section 6.

In addition, by resonantly driving the mirror portion 65, a large angle of deflection is achieved at a relatively low voltage. Particularly if an MEMS mirror fabricated by a micromachining process is used as the mirror portion, a beam deflection section 6 including a mirror portion 65 with dimensions of about 1 mm square can be manufactured at a reduced cost. Thus, the present invention contributes to improving the image quality using a small and inexpensive structure that is effectively applicable for use in a portable image projector, among other things.

Figure 3:
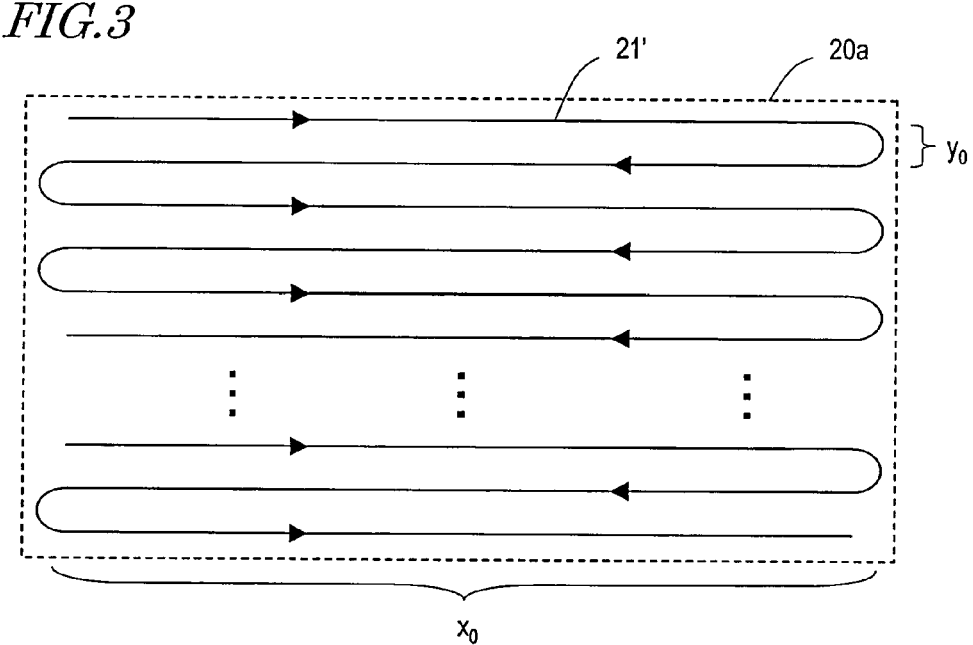
FIG. 3 illustrates another exemplary laser beam scanning pattern to produce an image.
Figure 4:
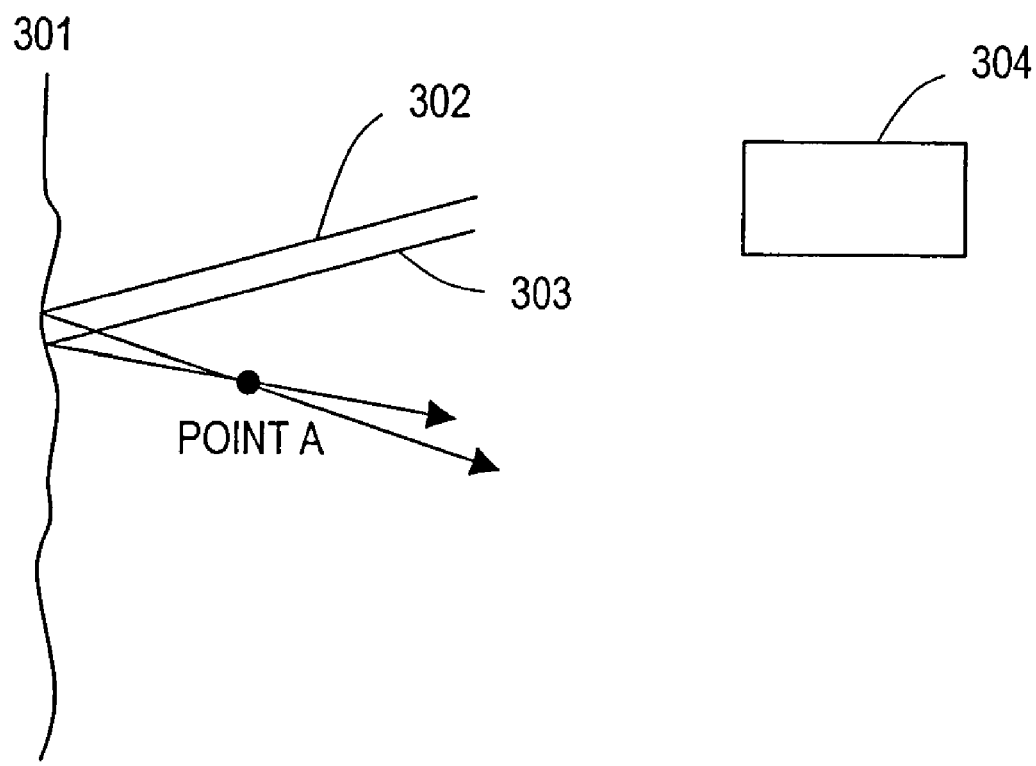
FIG. 4 is a schematic representation illustrating how speckle noise is produced.

In the preferred embodiment described above, an image is supposed to be produced by making a scanning laser beam draw the same Lissajous pattern repeatedly. However, the image may also be projected by making the scanning laser beam draw a different pattern a number of times. For example, the beam deflection section 6 may be driven such that a beam spot trace 21' is left by raster-scanning a screen area 20a with a laser beam such that the laser beam goes back and forth horizontally along a length $X_0$ and goes down by a length $Y_0$ vertically at the right and left ends of the area 20a as shown in FIG. 3. Even if an image is produced by repeatedly drawing the raster scanning pattern shown in FIG. 3, the speckle patterns produced on the image can also be averaged and become much less noticeable by defining the repetitive frequency to be lower than the frame rate of the image. Alternatively, the laser beam may also scan in any pattern other than the one shown in FIG. 3.

Also, in FIG. 1, the area in which the laser beam scans to draw a Lissajous pattern is supposed to be as large as the area 20a of the image projected. However, the area in which the laser beam scans to draw a Lissajous pattern may be larger than the area 20a of the image projected. In that case, while the laser beam is scanning inside the image area 20a, the output of the laser diode may be increased so that the image is presented there. On the other hand, while the laser beam is scanning outside of the area 20a, the output of the laser diode may be decreased so that the reflected light produced by the laser beam becomes substantially imperceptible. Then, the outer peripheral portion of the Lissajous pattern will not be used for presentation of the image, and it is possible to prevent the beam trace density from increasing in the outer peripheral portion of the image area 20a. That is to say, the luminance will never be higher in the outer peripheral portion than in the central portion.

The preferred embodiments of the present invention described above are supposed to be a front projection image projector. However, the present invention is also applicable to a rear projection image projector no less effectively. In that case, the present invention is applicable to an image projection system such as a rear projection TV set, which includes the image projector of the preferred embodiment described above and a screen on which a laser beam is projected from the image projector and in which the screen and the image projector are arranged to make an image transmitted through the screen perceptible to the user.

INDUSTRIAL APPLICABILITY

The present invention can be used effectively in various types of image projectors that use a laser light source, and is applicable particularly effectively to a portable image projector that makes laser scanning using a deflection mirror.

The invention claimed is:

1. An image projector comprising
    a light source for emitting a laser beam, of which the intensity has been modulated in accordance with a modulation signal representing an image to be projected,
    a beam deflection section for deflecting the laser beam two-dimensionally such that the image is produced by repeatedly scanning a screen with the laser beam in a predetermined pattern,
    a mirror driving section for driving the beam deflection section; and
    a control section configured to control the mirror driving section such that the predetermined pattern has a repetitive frequency that is lower than a frame rate of the image.

2. The image projector of claim 1, wherein the predetermined pattern is a Lissajous pattern.

3. The image projector of claim 2, wherein the beam deflection section makes the deflection at first and second deflection frequencies f1 and f2 around first and second axes of deflection, respectively, and
    wherein f1:f2=n:m (where m and n are relatively prime integers) is satisfied such that the deflected beam draws the Lissajous pattern, and wherein the repetitive frequency fr of the pattern satisfies fr=f1/n=f2/m.

4. The image projector of claim 3, wherein the beam deflection section includes a mirror portion that is resonantly driven about two axes and that reflects the laser beam.

5. The image projector of claim 1, wherein the predetermined pattern is a raster scan pattern.

6. The image projector of claim 4, wherein the beam deflection section is an MEMS mirror device that has been fabricated on a silicon wafer by a micromachining technology.

7. An image projection system comprising the image projector of claim 1 and a screen that either reflects or transmits the beam projected there.

8. The image projector of claim 5, wherein the beam deflection section is an MEMS mirror device that has been fabricated on a silicon wafer by a micromachining technology.

9. An image projection system comprising the image projector of claim 2 and a screen that either reflects or transmits the beam projected there.

10. An image projection system comprising the image projector of claim 3 and a screen that either reflects or transmits the beam projected there.

11. An image projection system comprising the image projector of claim 4 and a screen that either reflects or transmits the beam projected there.

12. An image projection system comprising the image projector of claim 5 and a screen that either reflects or transmits the beam projected there.

13. An image projection system comprising the image projector of claim 6 and a screen that either reflects or transmits the beam projected there.

* * * * *